(12) United States Patent
Lee et al.

(10) Patent No.: US 7,345,728 B2
(45) Date of Patent: Mar. 18, 2008

(54) FRINGE FIELD SWITCHING LIQUID CRYSTAL DISPLAY

(75) Inventors: Kyung Ha Lee, Kyoungki-do (KR); Chi Wook An, Kyoungki-do (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 228 days.

(21) Appl. No.: 10/938,258

(22) Filed: Sep. 10, 2004

(65) Prior Publication Data

US 2005/0068483 A1  Mar. 31, 2005

(30) Foreign Application Priority Data

Sep. 26, 2003  (KR) .................. 10-2003-0066965

(51) Int. Cl.
*G02F 1/1343* (2006.01)

(52) U.S. Cl. ..................................... 349/141

(58) Field of Classification Search ............... 349/141
See application file for complete search history.

(56) References Cited

U.S. PATENT DOCUMENTS 6,266,116 B1 * 7/2001 Ohta et al. ................. 349/141

FOREIGN PATENT DOCUMENTS

| KR | 1999-0086579 | 12/1999 |
|----|--------------|---------|
| KR | 2003-0047366 | 6/2003  |

OTHER PUBLICATIONS

Chinese Office Action and English translation.

* cited by examiner

*Primary Examiner*—James A. Dudek
(74) *Attorney, Agent, or Firm*—Ladas & Parry LLP

(57) ABSTRACT

Disclosed is a fringe field switching liquid crystal display. The fringe field switching liquid crystal display comprises a black matrix formed on an upper substrate, a pixel electrode formed above a lower substrate and having an edge portion overlapped with the black matrix by a predetermined region, and liquid crystal interposed between the upper substrate and the lower substrate, wherein the edge portion of the pixel electrode has a linear line shape. According to such an edge portion of the pixel electrode, it is possible to stably drive the liquid crystal located at the edge portion of the pixel electrode and also to restore the liquid crystal with rapidity.

13 Claims, 5 Drawing Sheets

FRINGE FIELD SWITCHING LIQUID CRYSTAL DISPLAY

BACKGROUND OF THE INVENTION

1. Field of the Invention

The present invention relates to a fringe field switching liquid crystal display (hereinafter, simply referred to as "FFS-LCD"), and more particularly to an FFS-LCD capable of preventing a misalignment of liquid crystal molecules caused by rubbing pressure in an FFS-LCD pixel structure, thereby preventing a display fault.

2. Description of the Prior Art

As generally known in the art, conventional thin-film liquid crystal displays (LCDs) are used as information display apparatuses, such as information display screens of portable terminals, displayers of notebook PCs, monitors of lap top computers, etc. Particularly, such liquid crystal displays have been widely used in various industrial fields in replacement of conventional CRT (cathode ray tube) monitors.

FIG. 1 is a plan view for illustrating a conventional FFS-LCD.

In addition, FIG. 2 is a view for showing a shape of a pixel electrode and a state of liquid crystal when an electric field is applied to the pixel electrode in the conventional FFS-LCD.

As shown in FIG. 1, the conventional FFS-LCD includes a pixel electrode 7, which is formed on the upper surface of a common electrode 4. The pixel electrode 7 has a slit pattern 7a. Herein, it is recommended that an edge portion of slit pattern 7a of the pixel electrode 7 should be formed in a constant angle of incline, but in actuality, as shown in FIG. 2, the edge portion of the slit pattern 7a of the pixel electrode 7 is formed in a curved line shape due to limitations of an exposure process.

In FIG. 1, reference numeral '2' represents a gate line, reference numeral '3' represents a data line, and reference numerals 5 and 6 represent source and drain electrodes respectively.

FIG. 3A is a view for showing a state of liquid crystal 8 when an electric field is not applied to the pixel electrode, and FIG. 3B is a view for showing a state of the liquid crystal 8 when a high electric field is applied to the pixel electrode. In addition, FIG. 30 is a view for showing a fault state of the liquid crystal 8, which is caused by a misalignment of liquid crystal 9 resulting from a high electric field and/or rubbing pressure.

Meanwhile, FIG. 4 is a view for explaining a problem which exists in the conventional FFS-LCD.

The operation of the conventional FFS-LCD having such a construction is as follows.

When any electric field is not formed at the common electrode and the pixel electrode, liquid crystal 8 is horizontally aligned as shown in FIG. 3A. In FIG. 3A, an arrow represents a rubbing direction.

Meanwhile, when a low electric field is applied, the liquid crystal is twisted by a few angles from the horizontal direction, and when a middle-degree electric field is applied, the liquid crystal is twisted by a little more degrees than those caused when the low electric field is applied.

In addition, as shown in FIGS. 2 and 3B, when a high electric field is applied to the liquid crystal 8, molecules of the liquid crystal 8 are twisted in such a manner that twisting angles of the molecules become enlarged more and more, to a right angle in maximum, as they reach the end part of an edge portion of the pixel electrode having a curved line shape due to an electric field interference between a black matrix (not shown) and the pixel electrode 7, so that the molecules of the liquid crystal 8 are vertically aligned at the end part of the edge portion. Since such an alignment may exert an influence on rubbing pressure, as shown in FIG. 3C, a circle phenomenon generated in the edge portion of the pixel electrode complicates the mobility of the liquid crystal according to applied voltages, thereby causing a fault due to a misalignment of liquid crystal when rubbing pressure is applied in a white gradation state.

That is, as shown in FIGS. 3C and 4, when rubbing pressure is applied under the white gradation state, the liquid crystal may not return to an initial alignment state, so a rubbing trace, that is, disclination lines 9 may occur.

SUMMARY OF THE INVENTION

Accordingly, the present invention has been made to solve the above-mentioned problems occurring in the prior art, and an object of the present invention is to provide a fringe field switching liquid crystal display, in which an edge portion of the slit pattern of a pixel electrode is changed from a curved line shape into a linear line shape so as to correct a misalignment of liquid crystal, thereby preventing a rubbing trace, such as a disclination line, from being created in the edge portion of the slit pattern of the pixel electrode.

In order to accomplish this object, there is provided a fringe field switching liquid crystal display comprising: a black matrix formed on an upper substrate; a pixel electrode formed above a lower substrate and having an edge portion of a slit pattern overlapped with the black matrix by a predetermined region; and liquid crystal interposed between the upper substrate and the lower substrate, wherein the edge portion of the slit pattern of the pixel electrode has a linear line shape.

The linear line shape includes a wedge shape and a structure having two '⊏'-shaped protrusions protruding in opposition to each other.

The edge portion has a structure having a width, which becomes enlarged more and more in a direction of an end part of the edge portion.

The edge portion is aligned in parallel to a central portion of the slit pattern of the pixel electrode, and an end part of the edge portion is inclined by a predetermined angle with respect to the central portion of the slit portion.

The edge portion of the slit pattern of the pixel electrode is aligned such that the edge portion is inclined at an angle of 5° to 9° with respect to the central portion of the slit pattern of the pixel electrode.

The edge portion includes a structure having an end part, which is bent by 9° to 12° with respect to the slit pattern of the pixel electrode.

In accordance with another aspect of the present invention, there is provided a fringe field switching liquid crystal display comprising: a black matrix formed on an upper substrate; a pixel electrode formed above a lower substrate, an edge portion of the slit pattern of the pixel electrode being overlapped with the black matrix by a predetermined region; and liquid crystal interposed between the upper substrate and the lower substrate, wherein the edge portion of the pixel electrode has a linear line shape and is aligned in such a manner that the edge portion of the slit pattern is inclined by a predetermined angle with respect to a central portion of the slit pattern of the pixel electrode.

The edge portion includes a structure having an end part, which is bent by 9° to 12° with respect to the edge portion of the slit pattern of the pixel electrode.

The edge portion has a structure having a width, which becomes enlarged more and more in a direction of one side of the edge portion.

The edge portion is aligned such that the edge portion is inclined at an angle of 5° to 9° with respect to the central portion of the slit pattern of the pixel electrode.

In accordance with still another aspect of the present invention, there is provided a fringe field switching liquid crystal display comprising: a black matrix formed on an upper substrate; a pixel electrode formed above a lower substrate, an edge portion of the slit pattern of the pixel electrode being overlapped with the black matrix by a predetermined region; and liquid crystal interposed between the upper substrate and the lower substrate, wherein the edge portion of the slit pattern of the pixel electrode has a linear line shape and is aligned in such a manner that the edge portion is inclined by a predetermined angle with respect to a central portion of the slit pattern of the pixel electrode.

The linear line shape includes a wedge shape and a structure having two '⊏'-shaped protrusions protruding in opposition to each other.

The edge portion is aligned such that an end part of the edge portion is inclined at an angle of 9° to 12° with respect to the edge portion of the slit pattern of the pixel electrode.

The edge portion has a structure having a width, which becomes enlarged more and more in a direction of one side of the edge portion.

The edge portion is aligned such that the edge portion is inclined at an angle of 5° to 9° with respect to the central portion of the slit pattern of the pixel electrode.

In accordance with still another aspect of the present invention, there is provided a fringe field switching liquid crystal display comprising: a black matrix formed on an upper substrate; a pixel electrode formed above a lower substrate, of the pixel electrode, an edge portion of the slit pattern being overlapped with the black matrix by a predetermined region; and liquid crystal interposed between the upper substrate and the lower substrate, wherein the edge portion of the slit pattern of the pixel electrode has a linear line shape while the edge portion is aligned in such a manner that the edge portion is inclined by a predetermined angle with respect to a central portion of the slit pattern of the pixel electrode, and the edge portion has a structure having of an end part, a side face of which is inclined.

The linear line shape includes a wedge shape and a structure having two '⊏'-shaped protrusions protruding in opposition to each other.

The end part of the edge portion is aligned to be inclined at an angle of 9° to 12° with respect to the edge portion of the slit pattern of the pixel electrode.

The edge portion has a structure having a width, which becomes enlarged more and more in a direction of an end part of the edge portion.

The edge portion of the slit pattern of the pixel electrode forms mixed angles including a first angle larger than an angle defined between a central portion of the slit pattern of the pixel electrode and a rubbing direction and a second angle smaller than the angle defined between the central portion of the slit pattern of the pixel electrode and the rubbing direction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
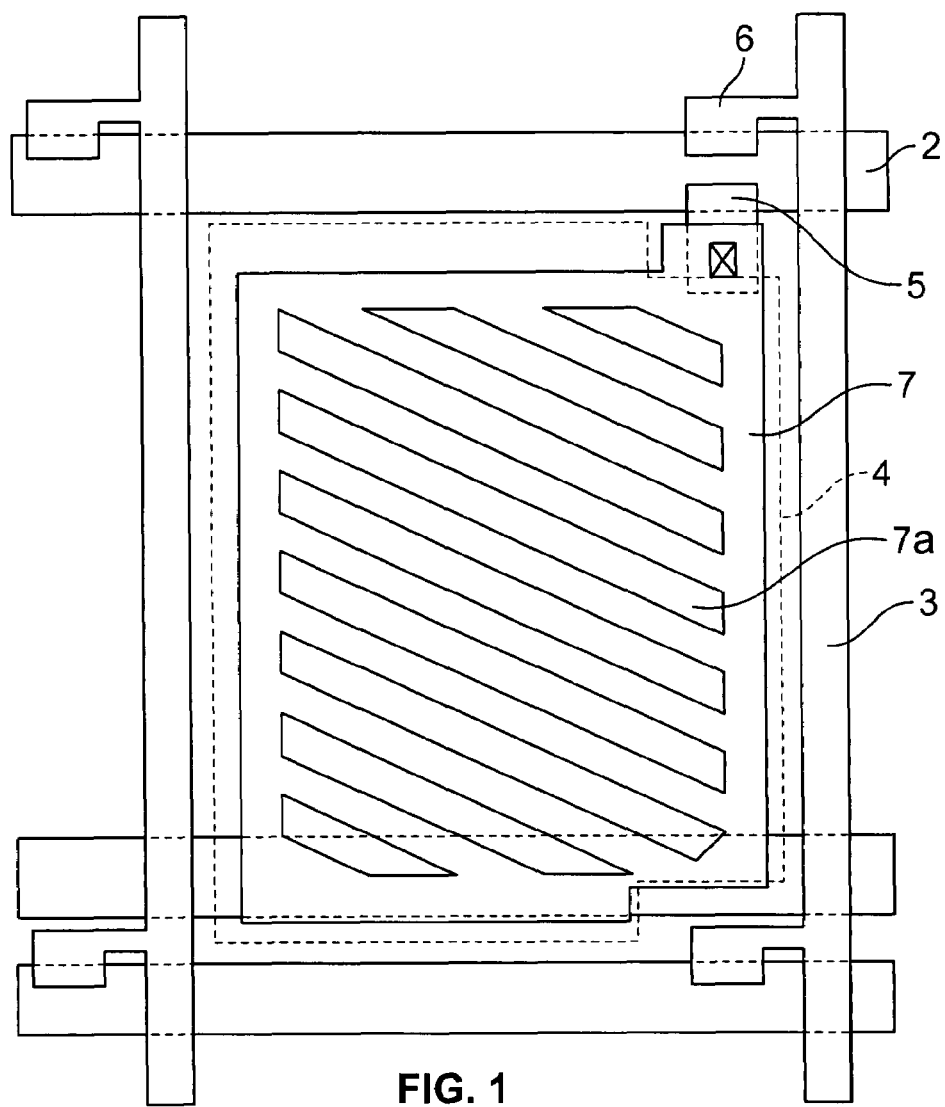
FIG. 1 is a plan view for illustrating a conventional FFS-LCD.
Figure 2:
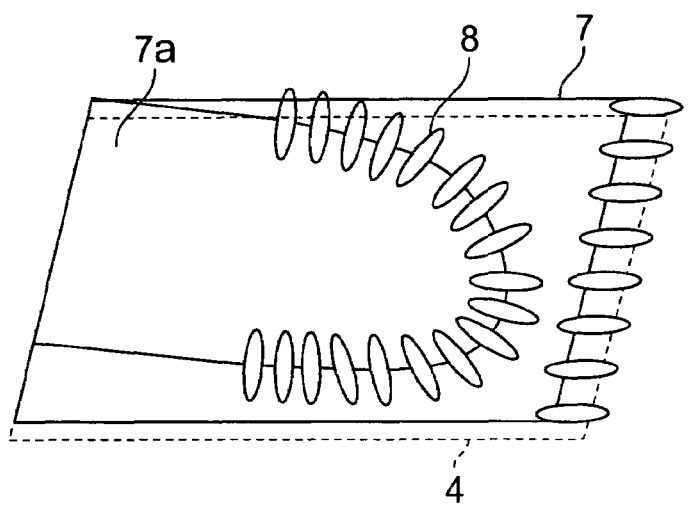
FIG. 2 is a view for showing a shape of a pixel electrode and a state of liquid crystal when an electric field is applied to the pixel electrode.
Figure 3A:
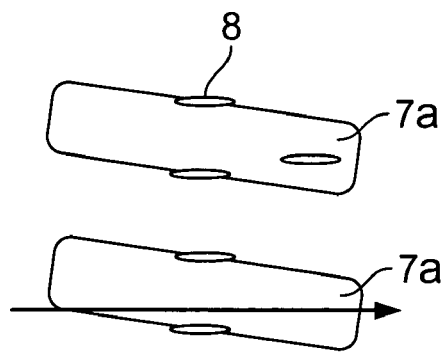
FIG. 3A is a view for showing a state of liquid crystal when an electric field is not applied to the pixel electrode.
Figure 3B:
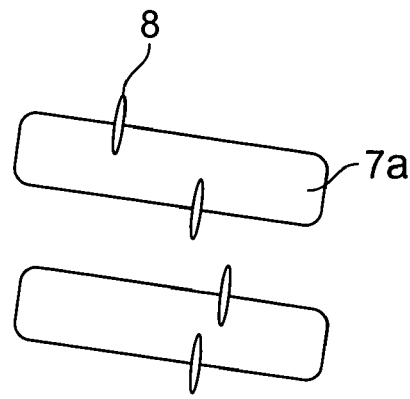
FIG. 3B is a view for showing a state of liquid crystal when a high electric field is applied to the pixel electrode.
Figure 3C:
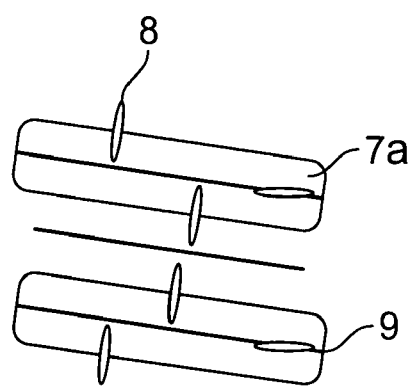
FIG. 3C is a view for showing a fault state of liquid crystal in which a liquid crystal alignment is distorted due to a high electric field and/or rubbing pressure.
Figure 4:
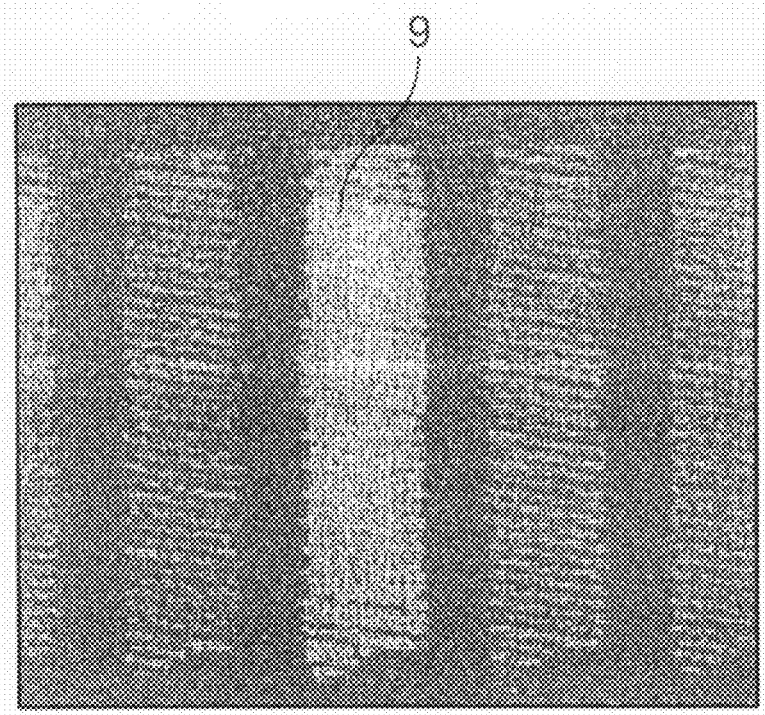
FIG. 4 is a view for explaining a problem of a conventional FFS-LCD.

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 5:
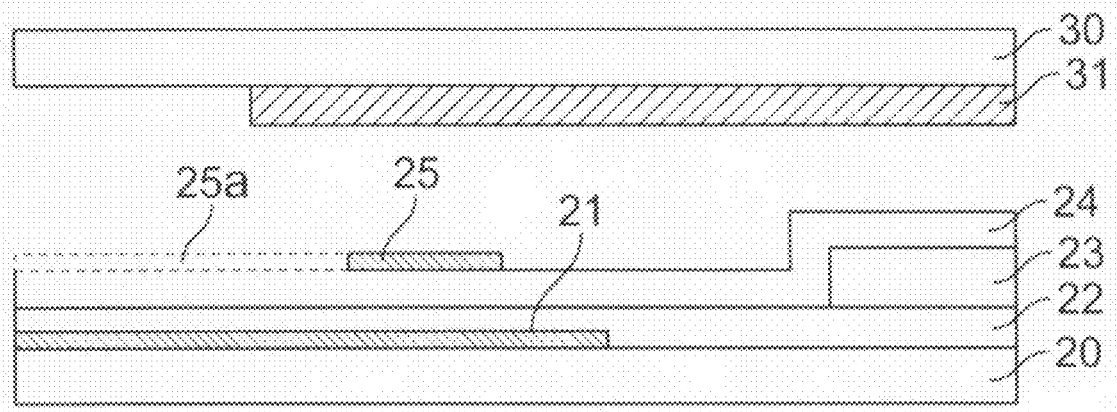
FIG. 5 is a sectional view illustrating a fringe field switching liquid crystal display according to an embodiment of the present invention.

FIG. 5 is a sectional view illustrating a fringe field switching liquid crystal display (hereinafter, simply referred to as "FFS-LCD") according to an embodiment of the present invention.

As shown in FIG. 5, a FFS-LCD according to the present invention includes a common electrode 21 formed on a lower substrate 20, a pixel electrode 25 formed above the common electrode 21, a black matrix 31 formed on an upper substrate 30. Herein, a predetermined region of the black matrix 31 formed on the upper substrate 30 is overlapped over an edge portion of slit pattern 25a of the pixel electrode 25 formed above the lower substrate 20. In addition, liquid crystal (not shown) is interposed between the two substrates.

Figure 6:
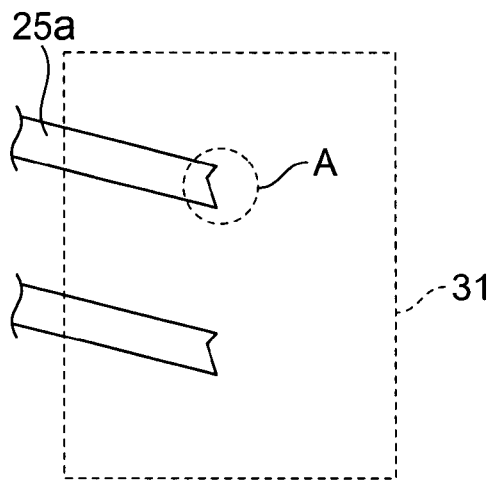
FIG. 6 is a plan view for schematically illustrating a shape of an edge portion of a slit pattern of a pixel electrode in an FFS-LCD according to a first embodiment of the present invention.

FIG. 6 is a plan view for schematically illustrating a shape of an edge portion of slit pattern 25a of a pixel electrode in an FFS-LCD according to a first embodiment of the present invention.

As shown in FIG. 6, according to the first embodiment of the present invention, an edge portion of slit pattern 25a of the pixel electrode 25 having a linear line shape may be formed in a wedge shape A. Herein, the edge portion of slit pattern 25a of the pixel electrode 25, which has the wedge shape A, may be aligned in line with a central portion of the slit pattern of the pixel electrode 25 as shown in FIG. 6, or may be inclined from the central portion of the pixel electrode by a predetermined angle, which is not shown.

Figure 7:
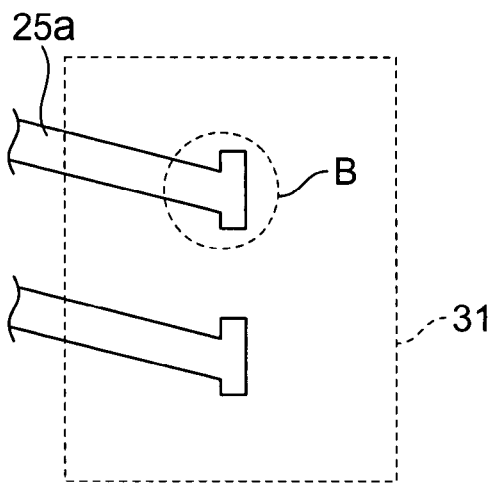
FIGS. 7 and 8 are plan views for schematically illustrating shapes of edge portions of the slit pattern of pixel electrodes in FFS-LCDs according to a second embodiment of the present invention.
Figure 8:
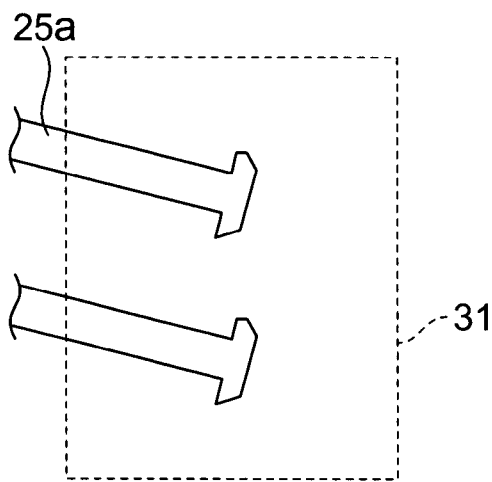

FIGS. 7 and 8 are plan views for schematically illustrating shapes of edge portions of slit pattern 25a of pixel electrodes in FFS-LCDs according to a second embodiment of the present invention.

As shown in FIG. 7, according to the second embodiment of the present invention, an edge portion of slit pattern 25a of the pixel electrode 25 having a linear line shape includes a structure B, an end part of which is formed by two '⊏'-shaped patterns protruding in opposition to each other. In addition, in the structure B having two '⊏'-shaped patterns at the end part thereof, one side of each '⊏'-shaped pattern may be inclined as shown in FIG. 8.

Figure 9:
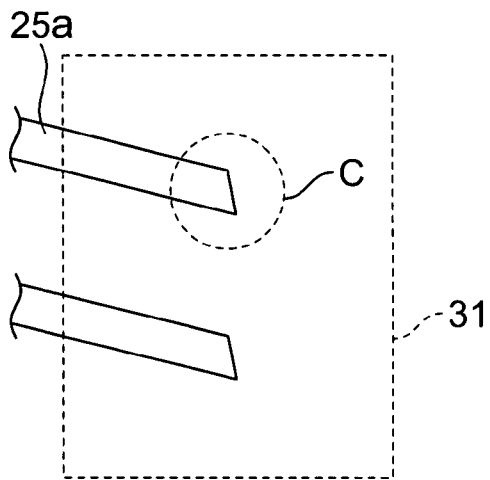
FIG. 9 is a plan view for schematically illustrating a shape of an edge portion of the slit pattern of a pixel electrode in an FFS-LCD according to a third embodiment of the present invention.

FIG. 9 is a plan view for schematically illustrating a shape of an edge portion of the slit pattern of a pixel electrode in an FF3-LCD according to a third embodiment of the present invention.

As shown in FIG. 9, according to the third embodiment of the present invention, an edge portion of slit pattern 25a of the pixel electrode 25, which has a linear line shape, may be formed in a structure C in which one side face is inclined.

Figure 10:
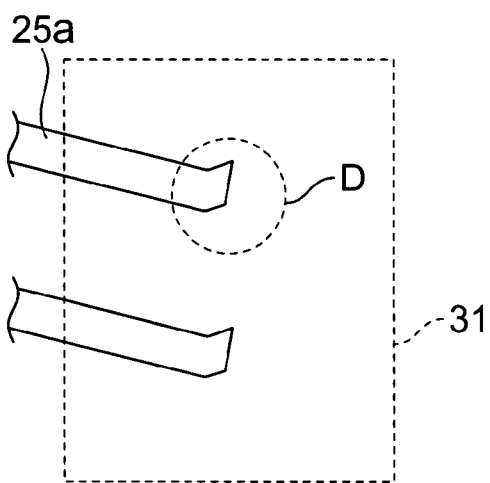
FIG. 10 is a plan view for schematically illustrating a shape of an edge portion of the slit pattern of a pixel electrode in an FFS-LCD according to a fourth embodiment of the present invention.

FIG. 10 is a plan view for schematically illustrating a shape of an edge portion of slit pattern 25a of a pixel electrode in an FFS LCD according to a fourth embodiment of the present invention.

As shown in FIG. 10, according to the fourth embodiment of the present invention, an edge portion of slit pattern 25a of the pixel electrode 25, which has a linear line shape, may include a structure D which is aligned in parallel to a central portion of slit portion of the pixel electrode and has an end part bent by 9° to 12°.

Figure 11:
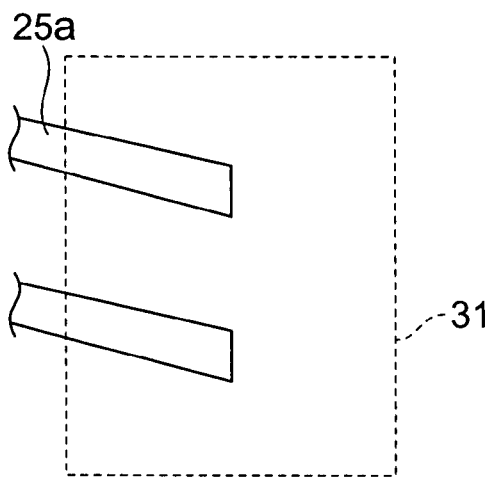
FIG. 11 is a plan view for schematically illustrating a shape of an edge portion of the slit pattern of a pixel electrode in an FFS-LCD according to a fifth embodiment of the present invention.

FIG. 11 is a plan view for schematically illustrating a shape of an edge portion of slit pattern 25a of a pixel electrode in an FFS-LCD according to a fifth embodiment of the present invention.

As shown in FIG. 11, according to the fifth embodiment of the present invention, an edge portion of slit pattern 25a of the pixel electrode 25, which has a linear line shape, may be formed in a structure having a width, which becomes enlarged more and more towards the end part of the slit pattern pThcl cloctrcdo, and having an end part inclined by 5° to 9° with respect to a central portion of slit pattern 25a of the pixel electrode.

With the fifth embodiment of the present invention, since the edge portion of the pixel electrode has a structure inclined by 5° to 9°, a restoring force of the liquid crystal is further improved as compared with the fourth embodiment of FIG. 10. Therefore, the liquid crystal located in the The above-mentioned edge portions of slit pattern 25a of pixel electrodes according to embodiments of the present invention may solve problems of a twisting speed and a restoring force of the liquid crystal, thereby further stabilizing the liquid crystal, as compared with the conventional edge portion having a curved line shape.

The operation of the FFS-LCD having the above-mentioned construction according to the present invention is as follows.

When an electric field is not applied, liquid crystal molecules are in a horizontal direction. When a high electric field is applied, the molecules of the liquid crystal are twisted in such a manner that twisting angles of the molecules become enlarged more and more, to 90° in maximum, as they reach a central portion in the end part of the edge portion of the slit pattern of the pixel electrode due to an electric field interference between a black matrix and the pixel electrode, so that the molecules of the liquid crystal are vertically aligned. In this case, since such an alignment may exert an influence on rubbing pressure, the restoring force and the bias force of the liquid crystal, which is located at the edge portion of the slit pattern of the pixel electrode, increase as a result of the edge portion of the slit pattern of the pixel electrode having a linear line shape. Therefore, when pressure occurs in the white gradation state, the alignment of the liquid crystal can return to an initial state.

Meanwhile, according to the present invention, the edge portion of the slit pattern of the pixel electrode forms mixed angles including a first angle larger than an angle defined between a central portion of the slit pattern of the pixel electrode and a rubbing direction and a second angle smaller than the angle defined between the central portion of the slit pattern of the pixel electrode and the rubbing direction.

According to the present invention, since the edge portion of the slit pattern of the pixel electrode is formed in a linear line shape, when the white gradation is applied, the restoring force of the liquid crystal, which is located at the edge portion of the slit pattern of the pixel electrode, may increase so that the liquid crystal can easily return to its initial position, and also the bias force applied to the liquid crystal may increase.

As described above, with a structure of the edge portion of the slit pattern of the pixel electrode changed according to the present invention, it is possible to stably drive the liquid crystal located at the edge portion of the slit pattern of the pixel electrode and also to restore the liquid crystal with rapidity.

Therefore, due to the reduction of the distortion of the liquid crystal alignment, it is possible to prevent a rubbing trace or disclination lines from occurring in a display image even if external physical power, such as rubbing pressure, is applied to the liquid crystal. Consequently, the response speed of the liquid crystal is improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fringe field switching liquid crystal display comprising:
   a black matrix formed on an upper substrate;
   a substantially planar pixel electrode formed above a lower substrate, said pixel electrode having a plurality of slit patterns each slit pattern having opposing, first and second substantially linear and parallel sides that extend to an edge portion of the slit pattern that is overlapped with the black matrix by a predetermined region, the end of the edge portion of the slit pattern being formed to have an inwardly-extending oblique angle, the apex and sides of which form an inwardly-extending wedge-shape at the end of the pixel; and liquid crystal interposed between the upper substrate and the lower substrate.

2. The fringe field switching liquid crystal display as claimed in clam 1, wherein the wedge-shape is replaced with a structure that includes two opposing protrusion structures that imbue the slit pattern with a 'T' shape.

3. The fringe field switching liquid crystal display as claimed in clam 1, wherein the slit pattern of claim 1 is replaced by a slit pattern having opposing, substantially linear but non-parallel sides that diverge away from each other as they extend toward where they are overlapped by the black matrix, the divergence of the linear sides imbuing the slit pattern with a trapezoidal shape, the edge portion has a structure having a width, which becomes enlarged in a direction of an end part of the edge portion.

4. The fringe field switching liquid crystal display as claimed in clam 1, wherein the slit pattern is replaced by a slit pattern having a central portion and said first and second substantially linear sides are evenly spaced from each other about the central portion, said pixel electrode extends to a point that is overlapped by the black matrix whereat the direction of both the first and second evenly spaced sides changes, and the edge portion is aligned in parallel to a central portion of the slit portion of the pixel electrode and an end part of the edge portion is inclined by a predetermined angle with respect to the central portion of the pixel electrode.

5. The fringe field switching liquid crystal display as claimed in claim 4, wherein the predetermined angle edge portion of the slit pattern is aligned such that the edge portion is inclined at an angle of 5° to 9° with respect to the central portion of the slit portion of the pixel electrode.

6. The fringe field switching liquid crystal display as claimed in clam 1, wherein the inwardly-extending oblique wedge-shape at the end of the pixel is replaced by an edge portion that includes a structure having an end part, which is bent by 9° to 12° with respect to the slit portion of the pixel electrode.

7. A fringe field switching liquid crystal display comprising:
 a black matrix formed on an upper substrate;
 a pixel electrode formed above a lower substrate having a plurality of slit patterns, each slit pattern having an edge portion overlapped with the black matrix by a predetermined region; and
 liquid crystal interposed between the upper substrate and the lower substrate, wherein the edge portion of the slit pattern of the pixel electrode has a linear line shape;
 wherein the edge portion of the slit pattern of the pixel electrode forms mixed angles including a first angle larger than an angle defined between a central portion of the slit pattern of the pixel electrode and a rubbing direction and a second angle smaller than the angle defined between edge portion of the central portion of the pixel electrode and the rubbing direction.

8. A fringe field switching liquid crystal display comprising:
 a black matrix formed on an upper substrate;
 a pixel electrode formed above a lower substrate, having a plurality of slit patterns, each slit pattern having an edge portion overlapped with the black matrix by a predetermined region; and
 liquid crystal interposed between the upper substrate and the lower substrate, wherein the edge portion of the each slit pattern has a linear line shape and is shaped and arranged in such a manner that the linear line shape end portion forms a predetermined oblique angle with respect to the central portion of slit pattern of the pixel electrode.

9. The fringe field switching liquid crystal display as claimed in clam 8, wherein the edge portion includes a structure having an end part, which is bent by 9° to 12° with respect to the edge portion of the slit pattern.

10. The fringe field switching liquid crystal display as claimed in clam 8, wherein the edge portion has a structure having a width, which increases and becomes enlarged in the direction of one side of the end edge portion.

11. The fringe field switching liquid crystal display as claimed in clam 8, wherein the end edge portion is aligned such that the edge portion is inclined at an angle of 5° to 9° with respect to the central portion of the slit pattern of the pixel electrode.

12. A fringe field switching liquid crystal display comprising:
 a black matrix formed on an upper substrate;
 a common electrode formed on a lower substrate, the common electrode being a plate type electrode;
 a pixel electrode formed above the common electrode, said pixel electrode having a plurality of slit patterns, each slit pattern having an edge portion that is overlapped with the black matrix by a predetermined region, the end part of the edge portion of the slit pattern being inclined by a predetermined angle with respect to the central portion of the slit pattern of the pixel electrode; and
 a liquid crystal interposed between the upper substrate and the lower substrate.

13. The fringe field switching liquid crystal display as claimed in claim 12, wherein the edge portion includes a structure having an end part, which is bent by 9 degrees to 12 degrees with respect to the edge portion of the slit pattern.

* * * * *